(12) United States Patent
Tang

(10) Patent No.: US 7,604,192 B2
(45) Date of Patent: Oct. 20, 2009

(54) GRINDING APPARATUS FOR A CONDIMENT GRINDER

(75) Inventor: Yu Wing Tang, Kowloon (HK)

(73) Assignee: Samson Bright Industrial Company Limited, Kowloon (HK)

( * ) Notice: Subject to any disclaimer, the term of this patent is extended or adjusted under 35 U.S.C. 154(b) by 125 days.

(21) Appl. No.: 11/946,781

(22) Filed: Nov. 28, 2007

(65) Prior Publication Data
US 2009/0134255 A1   May 28, 2009

(51) Int. Cl.
*A47J 42/10* (2006.01)
(52) U.S. Cl. .................................... 241/169.1
(58) Field of Classification Search ............ 241/168, 241/169.1, DIG. 30
See application file for complete search history.

(56) References Cited

U.S. PATENT DOCUMENTS

| | | | |
|---|---|---|---|
| 4,793,560 A | 12/1988 | Schrödl | |
| 4,960,246 A * | 10/1990 | Fohrman | 241/169.1 |
| 6,224,005 B1 | 5/2001 | Wu | |
| 2005/0133644 A1 | 6/2005 | Wu | |

FOREIGN PATENT DOCUMENTS

| | | |
|---|---|---|
| GB | 2 396 573 | 6/2004 |
| GB | 2 412 616 | 10/2005 |

OTHER PUBLICATIONS

Combined Search and Examination Report under Sections 17 and 18(3), GB Application No. 0722945.3; mailing date, Feb. 29, 2008 (3 pp.).

* cited by examiner

*Primary Examiner*—Mark Rosenbaum
(74) *Attorney, Agent, or Firm*—Blakely, Sokoloff, Taylor & Zafman LLP

(57) ABSTRACT

A light weight, low cost grinder assembly for a pepper grinder includes male and female rotary grinding members spaced to create between them a gap which determines the size of the ground pepper. Each of the male and female members is a composite of a polymer part and a corrugated steel grinding member which is advantageously produced by pressing.

9 Claims, 5 Drawing Sheets

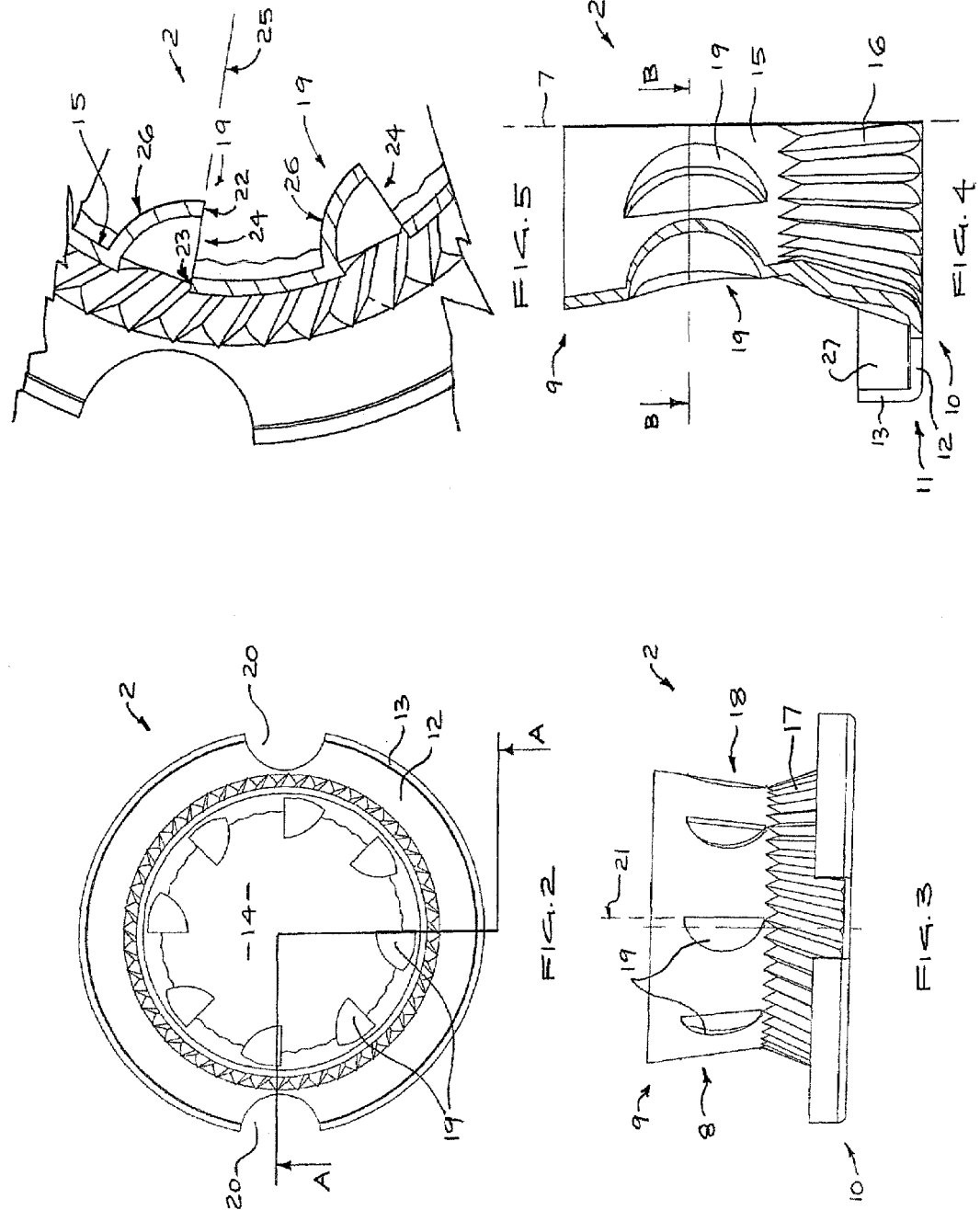

GRINDING APPARATUS FOR A CONDIMENT GRINDER

TECHNICAL FIELD

The present invention relates to a condiment grinder, and particularly to the grinding apparatus of a condiment grinder.

BACKGROUND OF THE INVENTION

Various types of grinder are known for pepper and other condiments. In a grinding assembly of these devices, grinding is effected by relative rotation between an inner grinding element and an outer grinding element. The two elements have, on the respective contact surfaces, teeth or ribs to grind the condiment. The surfaces are spaced so as to create between them a gap which determines the final grain size of the ground material. One or both of the grinding elements may be tapered and the teeth or ribs may be helicoid to promote axial movement of the condiment between the grinding elements.

Conventionally, grinding elements are manufactured from cast stainless steel. This allows their complex shape to be readily produced in a hard material that provides long life and corrosion-free performance. In grinders for many applications however, not only disposable grinders, manufacturing costs are an important consideration. Producing cast grinding elements is relatively costly and cast grinding elements are also heavy. It will therefore be understood that there is a need for light weight grinding elements having like performance to the prior art grinding elements, but which can be made more cost effectively.

DISCLOSURE OF THE INVENTION

According to one aspect of the present invention there is provided condiment grinding apparatus comprising:
  a female grinding element,
  a first aperture extending through the female grinding element, the first aperture defining an inner surface of the female grinding element,
  wherein the female grinding element is corrugated to provide first corrugated surface portions in the inner surface of the female grinding element, and second corrugated surface portions on an outer surface of the female grinding element; and
  a male grinding element,
  a second aperture extending through the male grinding element,
  wherein the male grinding element is corrugated to provide third corrugated surface portions in an outer surface of the male grinding element, and fourth corrugated surface portions on an inner surface of the male grinding element,
  a polymeric core in the male grinding element in contact with the inner surface of the male grinding element
  a third aperture extending through the core, the second and third apertures being aligned for receiving a grinding shaft, whereby
  the inner surface of the female grinding element and the outer surface of the male grinding element form a cavity for grinding condiment between the first and third corrugated surface portions upon relative rotation between the shaft and the female grinding element.

Preferably the first, second and third apertures are coaxial, the second and third apertures having a substantially square shaped cross-section, and the male grinding element is tapered, having a narrow first end and broader axially opposing second end, wherein the male grinding element extends between a square edge of the second aperture at the first end and a corrugated annular edge at the second end.

Preferably outer faces of the first and second ends of the male grinding element are substantially parallel.

Preferably the male and the female grinding element are formed by pressing of sheet metal.

Preferably the female grinding element has a plurality of circumferentially spaced teeth projecting from the inner surface of the female grinding element, each tooth formed by punching, the sheet metal being sheared by the punching action to separate first and second edges, the first edge being displaced from the second edge to form an opening, the apparatus further including a sleeve extending externally about the female grinding element to close each said opening.

Preferably the first and second edges are elongated in the axial direction and lie substantially in a common radial plane, a tapered face of each tooth extends substantially circumferentially from the first edge to the inner surface. Preferably each tapered face extends in a common circumferential direction.

Preferably the sleeve and female grinding element include respective radially outwardly-projecting circumferential flanges, an annular recess is formed in the flange on the female grinding element and receives the flange on the sleeve and an inner face of the sleeve frictionally engages the second corrugated surface portions.

Preferably the apparatus further includes a body defining a condiment reservoir and driving means for rotating the shaft, wherein the shaft extends through the condiment reservoir and the male and female grinding elements are mounted at abase of the condiment reservoir.

This invention provides grinding apparatus which is effective and efficient in operational use, and which may be economically manufactured.

BRIEF DESCRIPTION OF THE DRAWINGS

Preferred forms of the present invention will now be described by way of example with reference to the accompanying drawings, wherein.

FIG. 2 is a plan view of a female grinding element of the assembly of FIG. 1;

FIG. 3 is a side elevation of the female grinding element of FIG. 3;

FIG. 4 is a section along line AA of FIG. 2;

FIG. 5 is a fragmentary section along line BB of FIG. 4;

DESCRIPTION OF THE PREFERRED EMBODIMENTS

Figure 1:
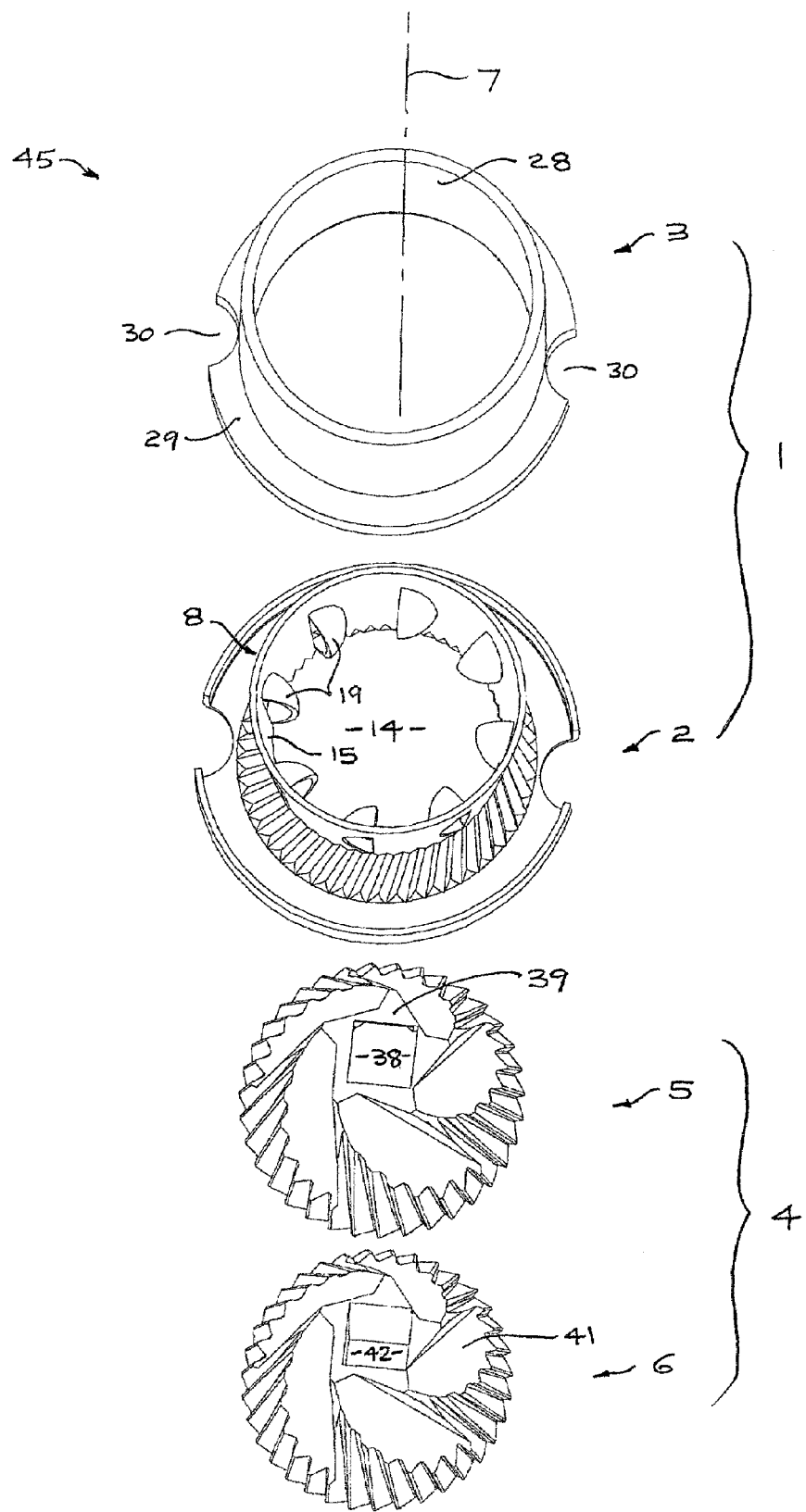
FIG. 1 is an exploded view of an embodiment of the condiment grinding apparatus of the invention.

Referring to the drawings, FIG. 1 shows a grinding assembly 45 for a condiment grinding apparatus such as a pepper grinder. The grinding assembly 45 includes a composite female member 1 assembled from a female grinding element 2 and a sleeve 3; and a composite male member 4 assembled from a male grinding element 5 and a core 6. The male and female members 1, 4 and their components are described with reference to their central axis 7. As used herein, the term "axial" refers to a direction substantially parallel to the axis 7. The term "radial" refers to a direction substantially orthogonal to the axis 7. The term "circumferential" refers to the direction of a circular arc having a radius substantially orthogonal to the axis 7.

As seen in FIGS. 1 to 4, 10 and 11 the female grinding element 2 is pressed or punched from stainless steel sheet and has a generally tubular section 8 extending from an upper end 9 to a lower end 10. Integral with the tubular section 8, a flange 11 extending from the lower end 10 includes a radially-aligned portion 12 and a cylindrical lip 13 defining an annular recess 27. Two diametrically opposing notches 20 are formed in the flange 11. An aperture 14 extends axially through the grinding element 2 and defines an inner surface 15. The outer end 10 is corrugated to provide helicoid first corrugated surface portions 16 in the inner surface 15, and helicoid second corrugated surface portions 17 on an outer surface 18 of the female grinding element 2. The upper end 9 includes eight circumferentially spaced punched teeth 19, generally aligned axially and projecting from the inner surface 15. Each tooth 19 is formed by punching, the material being sheared along a line 21 elongated in the axial direction to form first and second edges 22, 23. The first edge 22 is displaced inwardly from the second edge 23, both lying substantially in a common radial plane 25. In this manner each tooth provides an opening 24. A tapered face 26 of each tooth 19 extends substantially circumferentially from the first edge 22 to the inner surface 15. The teeth 19 are aligned such that the tapered faces 26 extend in a common circumferential direction and the mouth of each opening 24 is facing in the same direction (e.g. in the counter clockwise direction as seen in FIG. 5).

Figure 10:
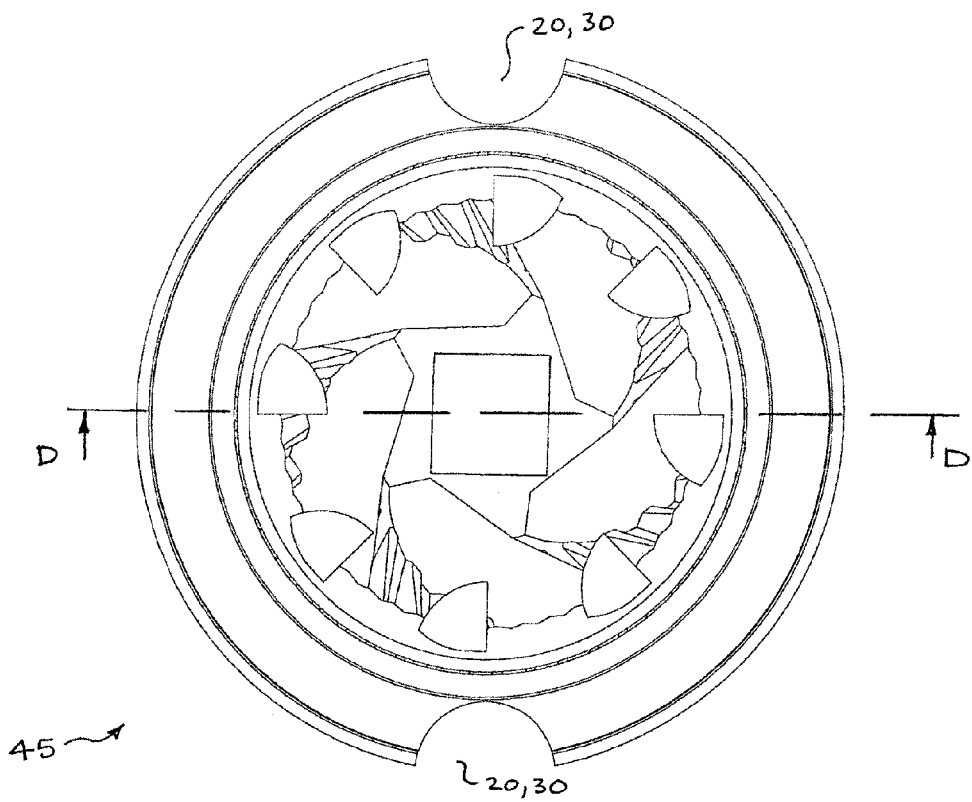
FIG. 10 is a plan view of the assembly of FIG. 1.
Figure 11:
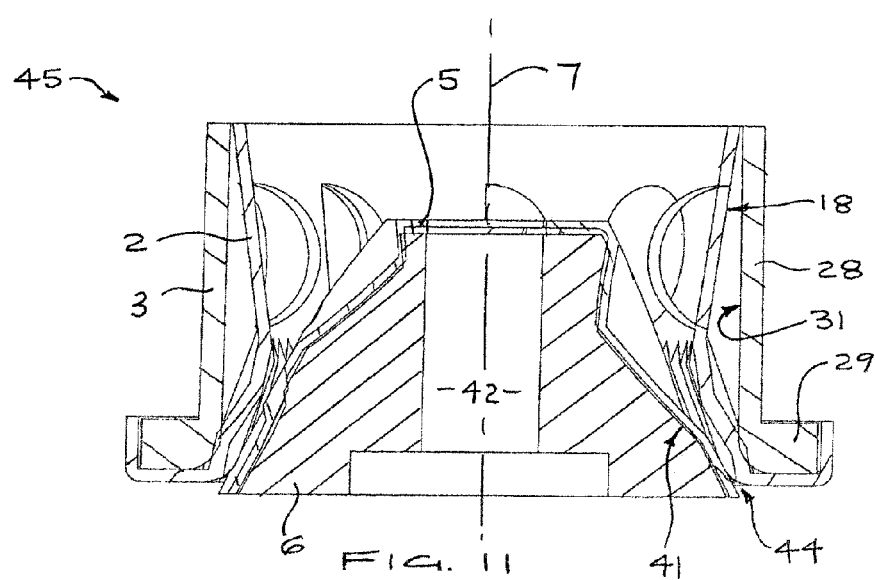
FIG. 11 is a cross section along line DD of FIG. 10.

The sleeve 3 is shown in FIGS. 1, 10 and 11 and is formed from polymer and has a cylindrical body 28 with an annular flange 29 at a lower end thereof in which two diametrically opposing notches 30 are formed. The sleeve 3 has an inner face 31 which sits adjacent the outer face 18 when the sleeve 3 is received in the female grinding element 2. The flange 29 is received in the recess 27 and the notch pairs 20, 30 angularly aligned. The relatively soft sleeve 3 is deformed by contact with the second corrugated surface portions 17, serving to restrict relative rotation between the sleeve 3 and grinding element 2.

FIGS. 1 and 6 to 11 show the male grinding element 5 which is pressed or punched from stainless steel sheet and is tapered from a narrow upper end 32 to a broader axially opposing lower end 33. The male grinding element 5 is corrugated to provide helicoid third corrugated surface portions 34 in an outer surface 35, and helicoid fourth corrugated surface portions 36 on an inner surface 37. An aperture 38 having a substantially square shaped cross-section extends axially through radially aligned face 39 at the upper end 32. A corrugated annular edge 40 at the lower end 33 also lies in a radially-aligned plane.

Figure 8:
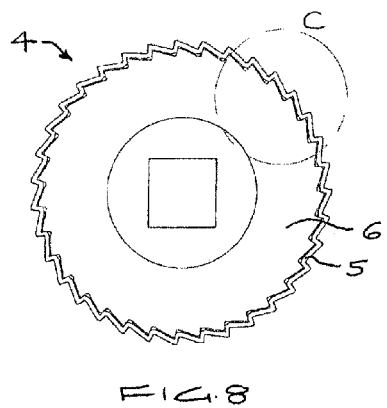
FIG. 8 is a bottom view showing the core assembled inside the male grinding element.
Figure 7:
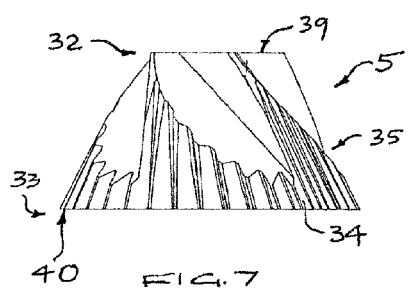
FIG. 7 is a side elevation of the male grinding element of FIG. 6.
Figure 9:
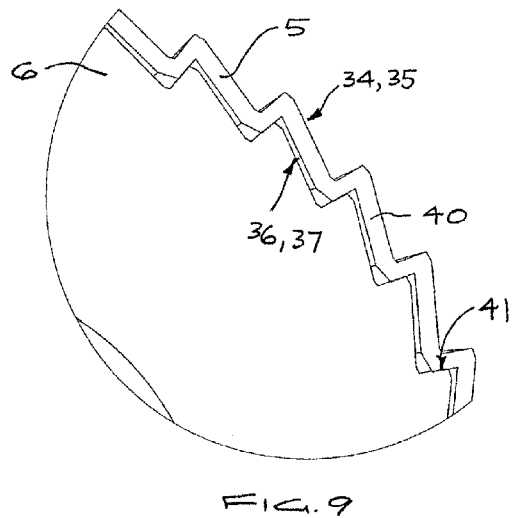
FIG. 9 is an enlargement of detail C of FIG. 8.
Figure 6:
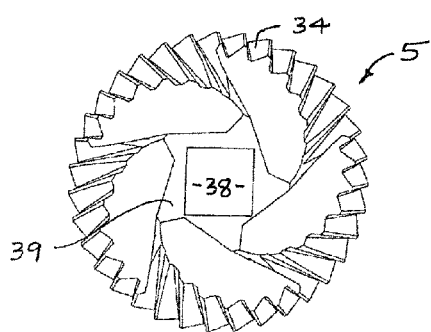
FIG. 6 is a plan view of a male grinding element of the assembly of FIG. 1.

The core 6 is formed of a polymer and, as illustrated in FIGS. 8 and 9, the core 6 is received in the male grinding element 5, having an outer surface 41 in contact with the inner surface 37, the complementary corrugations preventing relative rotation between the core 6 and the male grinding element 5. The core 6 allows proper axial alignment of the composite male member 4 to be maintained and it also serves to reinforce the thin-walled male grinding element 5, to distribute stresses in it. The core 6 may be adhesive bonded to the inner surface 37. An aperture 42 having a square shaped cross-section extends axially through the core 6, in alignment with the aperture 38, both receiving a grinder shaft 43 having a square shaped cross-section and fixed to the end of the shaft 43.

Figure 12:
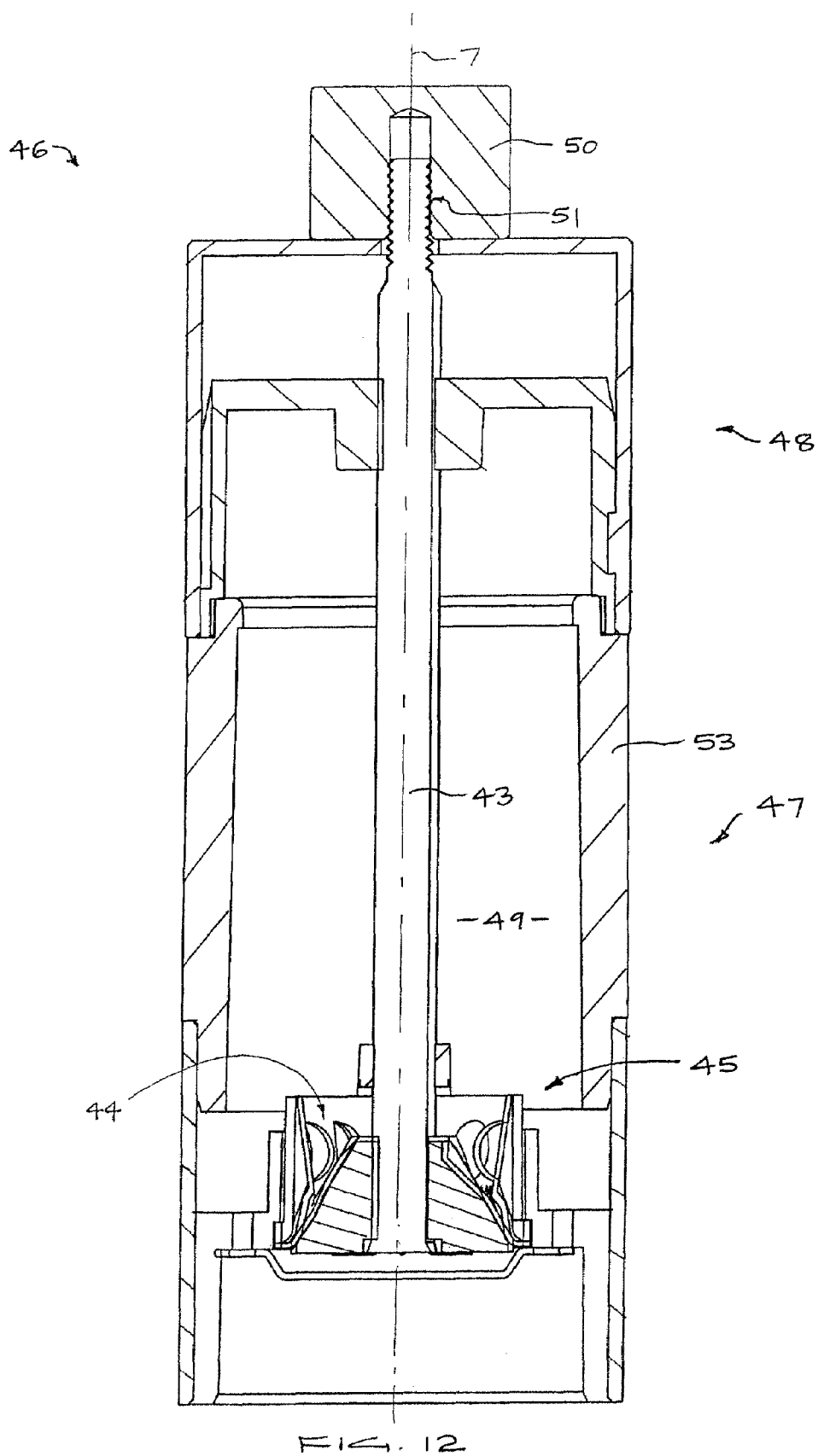
FIG. 12 is a schematic longitudinal section through a condiment grinder incorporating the assembly of FIG. 1.

By way of example of the application of the grinding assembly 45, FIG. 12 shows a condiment grinding apparatus 46 with a body 53 defining a condiment reservoir 49 at the base of which the grinding assembly 45 is mounted. The notch pairs 20, 30 are received in tabs (not shown) in the body 53, to prevent rotation of the female member 1. A rotary handle 48 is fixed to the top of the body 47 and is rotationally fast with the axially-extending shaft 43 with a square cross section and provides drive means for rotating the shaft 43. The shaft 43 is received in the aligned apertures 38, 42 with the male member 4 received in female member 1, a cavity 44 is provided for grinding condiment between the corrugated surface portions 16, 34 upon rotation of the handle 48. An adjuster knob 50 is attached by a screw thread 51 to the top of the shaft 43, such that rotation of the knob 50 moves the shaft 43 and the Male member 4 fixed to the end of the shaft 43 to adjust the size of the ground condiment in the known way.

Aspects of the present invention have been described by way of example only and it should be appreciated that modifications and additions may be made thereto without departing from the scope thereof.

The invention claimed is:

1. Condiment grinding apparatus comprising:
   a female grinding element,
   a first aperture extending through the female grinding element, the first aperture defining an inner surface of the female grinding element,
   wherein the female grinding element is corrugated to provide first corrugated surface portions in the inner surface of the female grinding element, and second corrugated surface portions on an outer surface of the female grinding element; and
   a male grinding element,
   a second aperture extending through the male grinding element,
   wherein the male grinding element is corrugated to provide third corrugated surface portions in an outer surface of the male grinding element, and fourth corrugated surface portions on an inner surface of the male grinding element,
   a polymeric core in the male grinding element in contact with the inner surface of the male grinding element,
   a third aperture extending through the core, the second and third apertures being aligned for receiving a grinding shaft, whereby
   the inner surface of the female grinding element and the outer surface of the male grinding element form a cavity for grinding condiment between the first and third corrugated surface portions upon relative rotation between the shaft and the female grinding element.

2. The apparatus of claim 1 wherein the first, second and third apertures are coaxial, the second and third apertures having a substantially square shaped cross-section, and the male grinding element is tapered, having a narrow first end and broader axially opposing second end, the male grinding element extending between a square edge of the second aperture at the first end and a corrugated annular edge at the second end.

3. The apparatus of claim 2 wherein outer faces of the first and second ends of the male grinding element are substantially parallel.

4. The apparatus of claim 1 wherein the male and the female grinding element are formed by pressing of sheet metal.

5. The apparatus of claim 4 wherein the female grinding element has a plurality of circumferentially spaced teeth projecting from the inner surface of the female grinding element, each tooth formed by punching, the sheet metal being sheared along a line to form first and second edges, the first edge being displaced from the second edge to form an opening, the apparatus further including a sleeve extending externally about the female grinding element to close each said opening.

6. The apparatus of claim 5 wherein the edges are elongated in the axial direction and lie substantially in a common radial plane and a tapered face of each tooth extends substantially circumferentially from the first edge to the inner surface.

7. The apparatus of claim 6 wherein each tapered face is aligned in a common circumferential direction.

8. The apparatus of claim 5 wherein the sleeve and female grinding element include respective radially outwardly-projecting circumferential flanges, an annular recess is formed in the flange on the female grinding element and receives the flange on the sleeve and an inner face of the sleeve frictionally engages the second corrugated surface portions.

9. The apparatus of claim 1 further including a body defining a condiment reservoir and driving means for rotating the shaft, wherein the shaft extends through the condiment reservoir and the male and female grinding elements are mounted at a base of the condiment reservoir.

* * * * *